Jan. 5, 1954 D. H. MacDONALD 2,664,742
INSTRUMENT FOR SENSING THE DENSITIES OF FLUIDS
Filed Jan. 4, 1951 3 Sheets-Sheet 1
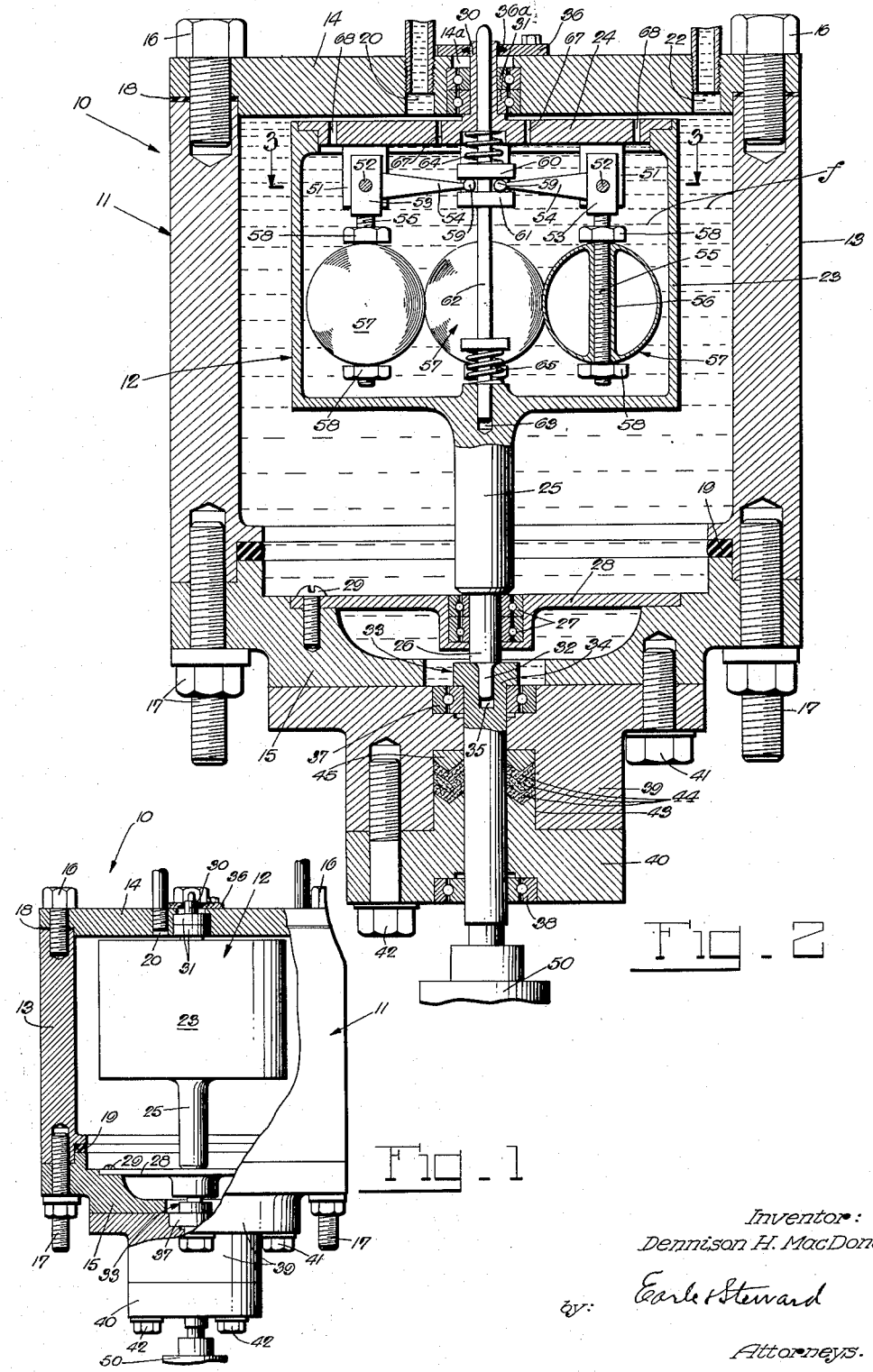
Inventor:
Dennison H. MacDonald
by: Earle & Steward
Attorneys.

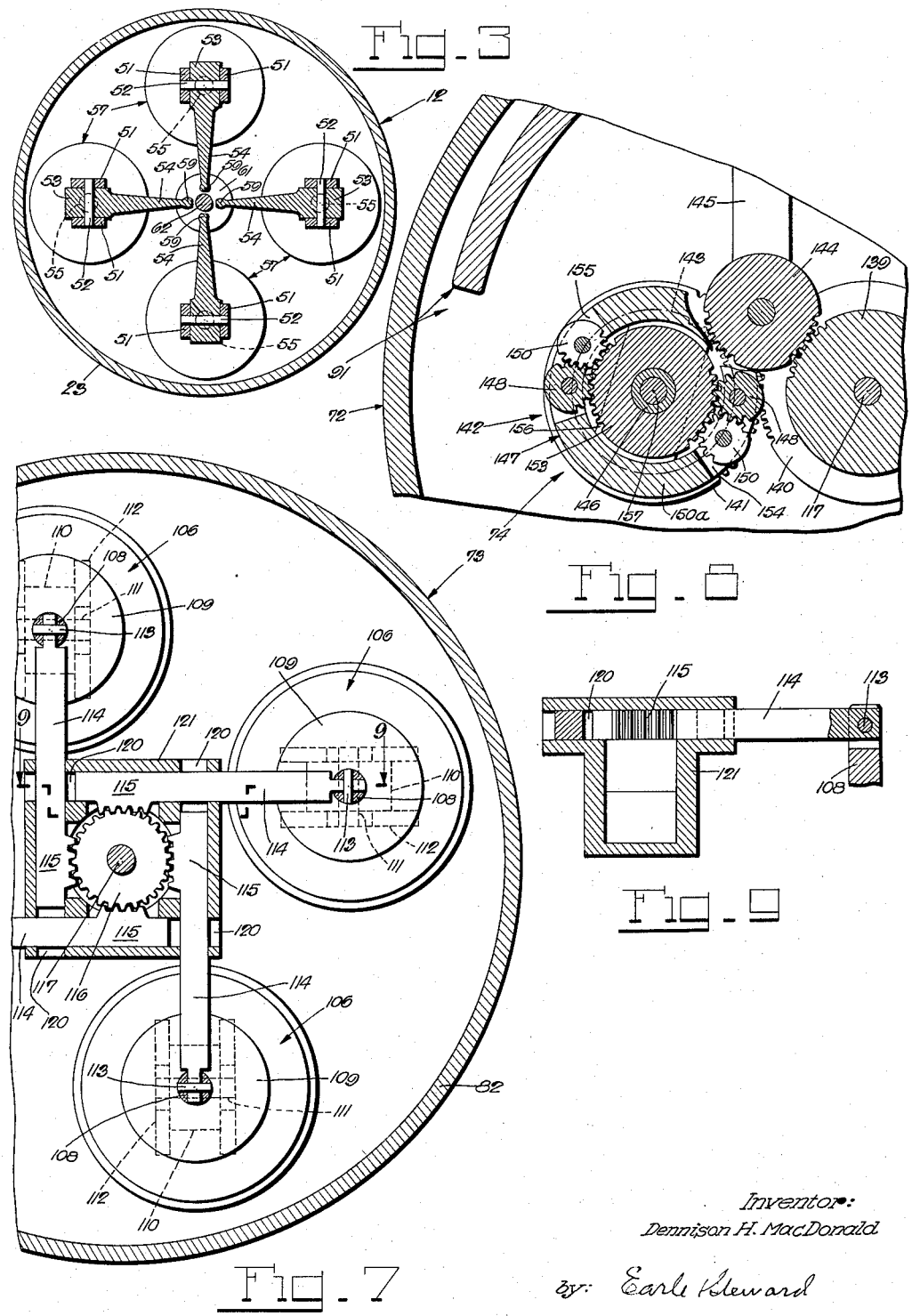

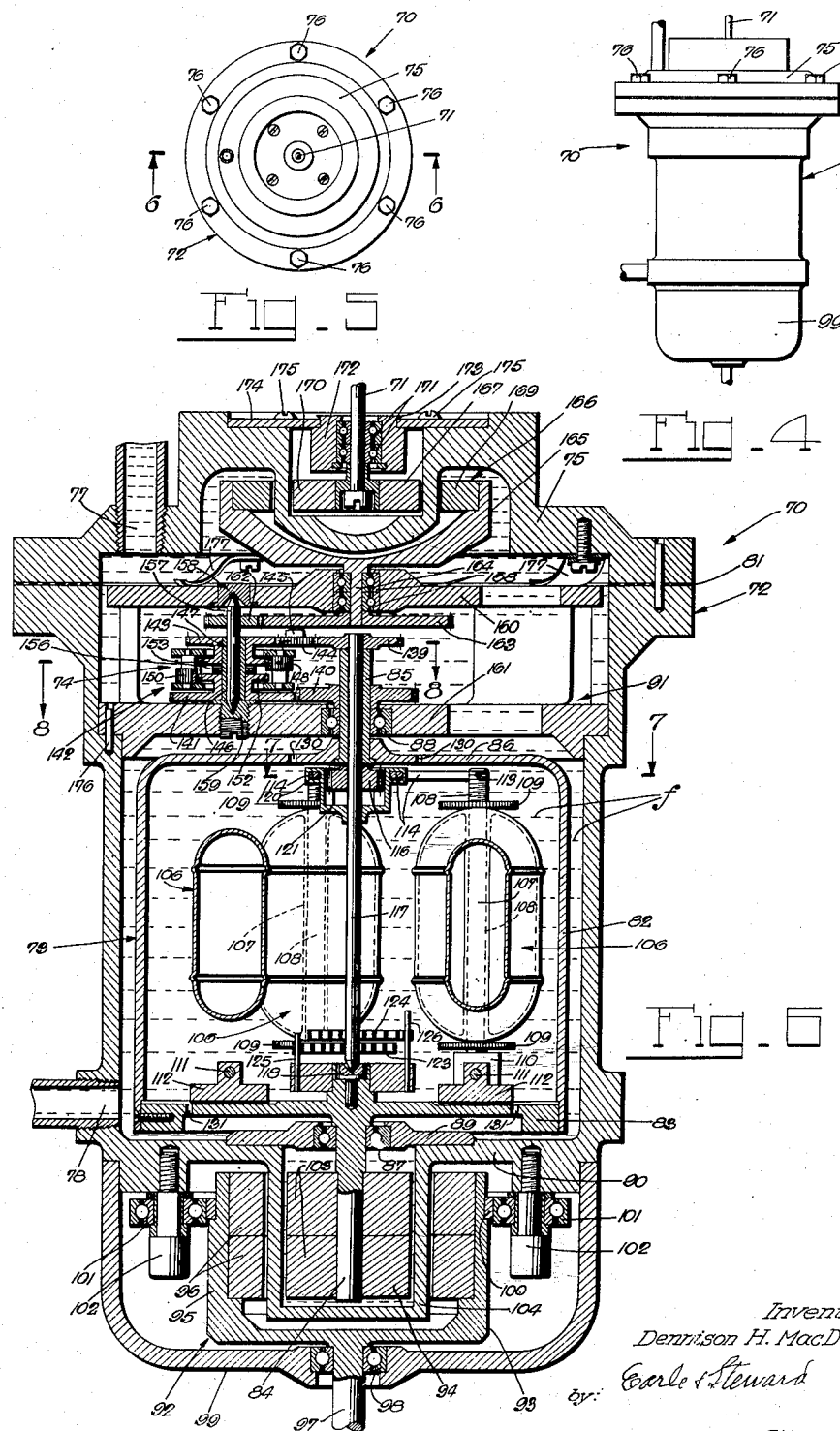

Patented Jan. 5, 1954

2,664,742

UNITED STATES PATENT OFFICE 2,664,742

INSTRUMENT FOR SENSING THE DENSITIES OF FLUIDS

Dennison H. MacDonald, East Haven, Conn., assignor to Revere Corporation of America, Wallingford, Conn., a corporation of Connecticut Application January 4, 1951, Serial No. 204,341

21 Claims. (Cl. 73—32)

1

This invention relates to instruments for sensing the densities of fluids.

There are many occasions on which it is desirable to sense the density of fluids by generation of density-responsive power of a magnitude sufficient to operate an indicator or an aggregate of an indicator or computer drive under various conditions under which the heretofore-known density-sensing instruments would and could not perform. By way of example, the reliable sensing of the density of fuels in aircraft installations, both in the air and on the ground, was a long-felt need in order to measure a fuel-supply by its weight, rather than by its volume, for the ultimate purpose of obtaining an accurate and direct indication of the potential power in the fuel of the supply without having to take various grades of fuel and varying atmospheric temperatures and pressures into consideration. The heretofore-known density-sensing instruments are by no means satisfactory for this and other purposes, not only because they fail to generate even a fraction of the power required to operate an indicator or an aggregate of an indicator or computer drive, especially where the indicator is rather remote from the fluid-testing location, but also because they fail to perform satisfactorily under frequently unavoidable conditions of vibration, acceleration and deceleration, and also when they are tilted into different positions, as in aircraft in flight or in portable or rollable equipment, for instance.

Accordingly, it is one of the main objects of the present invention to provide a fluid-density sensing instrument which is devoid of any of the above-mentioned shortcomings of the heretofore available or known instruments of this general type, thereby to render the instant instrument practical and advantageous for the above-mentioned and other purposes in mind.

A further object of the present invention is to provide a density-sensing instrument which generates a density-responsive power of exceptionally large magnitude that will assuredly operate an indicator or an aggregate of an indicator or computer drive under all conditions.

Another object of the present invention is to provide an instrument of this type which will accurately sense the density of a fluid even under exceptionally severe conditions of shock or vibration.

It is another object of the present invention to provide an instrument of this type which will accurately sense the density of a fluid regardless of any position the instrument may assume,

2 thereby rendering the instrument suited especially, though by no means exclusively, for use in aircraft.

A further object of the present invention is to provide an instrument of this type which performs accurately and reliably even when subjected, while in motion, to most rapid acceleration or deceleration, thereby even further enhancing its use in aircraft or other movable equipment.

It is still a further object of the present invention to provide an instrument of this type which is a self-contained unit of small bulk and simple and sturdy construction, yet is highly accurate and reliable in performance, and readily lends itself to efficient mass production at relatively low cost.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a side elevation, partly in section, of a density-sensing instrument embodying the present invention;

Fig. 2 is an enlarged longitudinal section through the same instrument;

Fig. 3 is a section taken on the line 3—3 of Fig. 2;

Fig. 4 is an elevational view of a density-sensing instrument embodying the present invention in a modified manner;

Fig. 5 is a top plan view of the modified instrument;

Fig. 6 is an enlarged longitudinal section through the modified instrument as taken on the line 6—6 of Fig. 5;

Figs. 7 and 8 are enlarged fragmentary sections taken on the lines 7—7 and 8—8, respectively, of Fig. 6; and Fig. 9 is a fragmentary section taken on the line 9—9 of Fig. 7.

Referring to the drawings, and more particularly to Figs. 1 and 2 thereof, the reference numeral 10 designates a density-sensing instrument which comprises, in the present instance, an outer casing 11 and a centrifuge 12 therein. The casing 11 is, in this instance, formed by a cylindrical member 13, and top and bottom covers 14 and 15, respectively, which are suitably secured to the cylindrical member 13, as by bolts 16 and 17, for instance. To seal the casing 11, there are preferably interposed between the cylindrical member 13 and the covers 14 and 15 gaskets 18 and 19, respectively. Fluid $f$ is, in the present instance, admitted into and discharged from the casing 11 through an inlet 20 and an outlet 21 respectively, in the top cover 14.

The centrifuge 12 comprises, in the present instance, a rotary container or bucket 23 which is preferably closed at its open top by a suitably secured cover 24 thereon. The bucket 23 is provided with a depending shank 25, having a reduced end 26 which is journaled, in this instance, in an antifriction bearing or bearings 27 in a spider 28 which may suitably be secured at 29 to the bottom cover 15. The cover 24 on the bucket 23 is provided with a sleeve-type extension 30 which, in this instance, is also journaled in an antifriction bearing or bearings 31 in the top cover 14 of the casing 11. The sleeve-extension 30 on the cover 24 extends to the outside of the casing 11 through an aperture 14a in the top cover 14 thereof, and the aperture 14a is sealed from the outside by a packing 36a in a packing-holder 36 on the top cover 14. For driving the bucket 23, the end of the shank 25 of the same may conveniently be flattened as at 32 in order to form the driven-element of a coupling 33 of which the driving-element 34 is provided with a recess 35 with which the driven-element is in registry. The driving-element 34 of the coupling 33 is journaled in preferably antifriction-type bearings 37 and 38 in a packing-case 39 and a packing-retainer 40, respectively.

The packing-case 39 may suitably be secured, as by bolts 41, to the bottom cover 15 of the casing 11, while the packing-retainer 40 is secured by bolts 42 to the packing-case 39. The packing-case 39 is provided with a preferably annular recess 43 wherein one or more packing-glands 44 are compressed between the retainer 40 and a deflector-ring 45 so as to be held in firm engagement with the coupling-element 34 to prevent leakage of fluid past the latter. The coupling-element 34 may at its outer end be coupled at 50 to an electric motor or any other suitable prime mover (not shown).

As best shown in Figs. 2 and 3, the cover 24 on the bucket 23 is provided with several preferably equiangularly-spaced pairs of depending lugs 51 which pivotally receive at 52 the ends 53 of several arms 54, respectively. Depending from the end 53 of each arm 54 is a stud 55 which carries a rigid body-member 57. Each of the body-members 57 is, in the present instance, hollow and of spherical shape, having a diametrically-extending tubular core 56 through which the respective stud 55 extends, and each body-member 57 is retained on its respective stud 55 by nuts 58 on the latter. In the present instance, there are provided four arms 54 with their respective body-members 57, and the free end of each arm 54 is provided with a follower 59 which rides between spaced collars 60 and 61 on a spindle 62 that is axially movable with its ends in a central bore 63 in the bucket 23 and in the sleeve-extension 30 of the cover 24.

In order to counteract the centrifugally-acting forces of the body-members 57 when the fluid-charged centrifuge is spinning, there are provided balanced and pre-loaded springs 64 and 65 which, in this instance, are compression-type springs arranged in the manner shown in Fig. 2.

The centrifuge 12 is provided with one or more fluid-inlet ducts 67 and one or more fluid-outlet ducts 68, so that the centrifuge will hold the same fluid $f$ as the casing 11.

The principle underlying the present instrument is derived from the equation of the centrifugal force of a rotating body. Thus, the centrifugal force of a rotating body is:

$$F = \frac{V \times S \times N^2 \times r \times k}{g}$$

wherein:

$V$ = volume of body,
$S$ = density of body,
$N$ = rotational velocity,
$r$ = distance from center of rotation to center of body,
$k$ = certain constants,
$g$ = acceleration of gravity.

This equation may be used as follows in order to determine the centrifugally-acting forces of the body-members 57 in the fluid-holding centrifuge.

$$F = \frac{V(S_B - S_F) \times N^2 \times r \times k}{g}$$

wherein:

$S_B$ = density of body members 57,
$S_F$ = density of fluid.

It follows from the latter equation that all factors involved in determining the centrifugally-acting forces of the body-members 57, with the exception of $S_F$ (density of fluid) are constants, assuming thereby that the rotational velocity $N$ of the body-members and the distance $r$ between their centers and the center of rotation remain constant. The density $S_F$ of the fluid will, of course, change with varying atmospheric temperature and pressure conditions, also with the introduction of different fluids into the centrifuge. It also follows from the above equation that the centrifugally acting forces of the body members 57 have positive values when the density of the fluid is lower than that of the body members 57, meaning that the latter will have a tendency to move outwardly from their normal rest position shown in Fig. 2 and further explained hereinafter. On the other hand, the centrifugal acting forces of the body members have negative values when the density of the fluid is higher than that of the body members 57, meaning that the latter will have a tendency to move inwardly from their normal rest position in Fig. 2. In the latter event, the forces acting on the body members are in reality centripetal forces, but they are nevertheless referred to hereafter as "centrifugal" forces although they have negative values. Hence, the difference in the densities of the fluid and body members, respectively, in the centrifuge is directly proportional to the centrifugally-acting forces of the body-members 57, with the proviso that plus and minus values of these forces denote lower and higher densities, respectively, of the fluid than that of the body members.

The present invention contemplates to counteract the centrifugally-acting forces of the body-members, whether positive or negative, with a force which varies with the latter forces, and to utilize the counteracting force for perceptibly sensing the density of the fluid in the centrifuge. In the instant instrument 10, the positive and negative centrifugally-acting forces of the body-members 57 are counteracted by the forces of the compression-springs 65 and 64, respectively, and their displacement from their normal balanced rest position (Fig. 2) is an accurate measure of the density of the fluid in the centrifuge, as will be readily understood. It is the balancing force of the springs 64 and 65 which holds the body members 57 in the normal rest position shown in Fig. 2 when the centrifuge 12 is at rest, and it appears from the foregoing equation that the centrifugal forces of the body members will be zero when the density of the fluid $f$ in the spinning centrifuge equals that of the body members 57, in which event the latter will remain in the position shown in Fig. 2 when the centrifuge is driven. Whenever the density of the fluid in the centrifuge deviates from that of the body members 57, the same displacement as that of the counteracting springs 64 and 65 is imparted also to the spindle 62 by virtue of its specific interposition in the operating connection between the springs 64, 65 and the body-members 57, wherefore the axial displacement of the spindle 62 from its normal position (Fig. 2) in either direction also affords an accurate indication of the density of the fluid in the centrifuge. Thus, the density of the fluid in the centrifuge may directly be read by the spindle 62, or an extension thereof, against a properly calibrated scale (not shown), or the spindle 62 may form the driving member of an aggregate of an indicator or computer drive.

The centrifuge 12 is driven at the same constant speed, and the body-members 57 may be displaced outwardly or inwardly from the normal rest position shown in Fig. 2, depending on the density of the fluid in the centrifuge, as will be readily understood. While the displacement of the body-members 57 by their centrifugally-acting forces entails some variation in the value of the factor $r$ in the foregoing equation of these forces, this variation of $r$ may safely be disregarded as it hardly affects the degree of the density of a fluid obtained by the present instrument.

In order that the centrifugally-acting forces of the body-members may be of sufficient magnitude to meet the objectives of generating a density-responsive power of large magnitude, as well as rendering the instrument, insofar as its correct performance is concerned, immune to vibration, shock, acceleration and deceleration, and tilting into any position, it is indicated by the foregoing equation of these centrifugally-acting forces to have body-members of large volumes. It is for this reason that the body-members 57 are preferably in the form of relatively large-size members which may be made hollow so as to encounter little difficulty with presently available rigid materials to keep their density at approximately that of the fluids to be tested.

Since the centrifugally-acting forces of the body-members are, as hereinbefore explained, quite considerable, it follows that the spindle 62 will without fail be shifted into a corresponding axial position even if the same should encounter considerable resistance by an indicator or an aggregate of an indicator or computer drive with which the spindle 62 may be operatively connected. Also, since the sensing of the density of the fluid in the instrument is responsive to the displacement of the body-members 57 therein in consequence of their centrifugally-acting forces, the instant instrument is also immune to even severe shock or vibration insofar as its reliable and accurate performance is concerned. Moreover, the instant instrument may be tilted or inverted into any position without in any way adversely affecting the correct performance of the same. Further, by being provided with the fluid-inlet 20 and fluid-outlet 22 in the casing 11, and with the inlet- and outlet-ducts 67 and 68, respectively, in the centrifuge 12, the present instrument may be in by-pass communication with a fluid-delivery line, for instance, to sense the density of the fluid and its density-variations under varying temperature and pressure conditions over an extended period of time. The present instrument is, for the foregoing reasons, suited especially, though by no means exclusively, for use in aircraft installations or other portable or rollable equipment. The present instrument is, for instance, admirably suited for use in aircraft installations for the purpose of measuring a fuel supply by its weight, rather than by its volume, for the ultimate purpose of obtaining an accurate and direct indication of the potential power in the fuel of the supply without having to take varying grades of fuel and varying atmospheric temperature and pressure conditions into consideration. To accomplish this, the instant instrument may be combined with a volumetric flow-meter for computing the weight of a quantity of fuel in a manner similar to that shown in the patent to Reeve, No. 1,278,077, dated September 3, 1918.

It will be observed from Fig. 2 that the bucket 23 of the centrifuge 12 is closed by the cover 24, so as to entrap the fluid therein and cause it to spin with the bucket at the same, or substantially the same, speed. Also, while the ducts 67 and 68 in the centrifuge are kept relatively small in size so as to accomplish the objective of entrapment of the fluid in the centrifuge for the above-mentioned purpose, they nevertheless permit substantial circulation of the fluid through the centrifuge, especially since the fluid-inlet ducts 67 are nearer the rotary axis of the centrifuge than the fluid-outlet ducts 68 so that the varying pressures of the fluid in the centrifuge will induce fluid-circulation therethrough.

The instant instrument 10, which is a self-contained unit effectively sealed against leakage of fluid therefrom, may readily be disassembled for the inspection, repair or replacement of any part or parts thereof. Thus, the covers 14 and 15 may readily be removed from the cylindrical member 13 of the casing 11 for access to, or removal of, the centrifuge 12. The centrifuge 12 is another self-contained unit which may readily be disassembled for the inspection, repair or replacement of any part or parts thereof.

The instant instrument 10 is adapted for sensing the densities of all kinds of fluids, and it is to be understood that the term "fluid" as used herein connotes liquids and gases, as well as finely-divided solids capable of flowing.

While in the hereinbefore described instrument 10 the density of a fluid therein is in the final analysis indicated by axial motion of the spindle 62, the density of a fluid in a modified instrument 70 is indicated by rotary motion of a spindle-member 71 (Figs. 4 to 6). This modified density-sensing instrument 70 comprises, in the present instance, a casing 72, a centrifuge 73, and a motion-transmitter 74.

The casing 72 is, in this instance, of general cup-shape, and is closed at the top thereof by a cover 75 which may suitably be secured thereto, as by screws 76, for instance (Fig. 5). The casing 72 is provided with a fluid-inlet 77 and a fluid-outlet 78. To prevent leakage of fluid $f$ from the interior of the casing 72, a gasket 81 is preferably interposed between the top of the casing 72 and the cover 75 thereon.

The centrifuge 73 is, in this instance, in the form of an inverted bucket 82 which is closed at its open end by a suitably secured cover 83. The bucket 82 is rotatably mounted in the casing 72 by having a shank 84 on its cover 83 and a press-fitted or otherwise secured sleeve 85 in its bottom 86 journaled in antifriction bearings 87 and 88, respectively. The bearing 87 may be provided in a spider 89 on the bottom wall 90 of the casing 72, while the bearing 88 may be provided in a bracket 91 in the casing 72.

The bucket 82 is driven or spun by any suitable prime mover (not shown) through intermediation of a magnetic coupling 92 having the driving and driven elements 93 and 94, respectively. The driving-element 93 of the coupling 92, which is in the form of a cup-shaped member 95 carrying a permanent magnet or magnets 96, is provided with a shaft-extension 97 which is journaled in a bearing 98 in a hood or cap 99 over the bottom of the casing 72. The driving-element 93 of the coupling is preferably provided with a wear-ring 100 of steel or the like, which cooperates with the outer races of a plurality of preferably equi-angularly-spaced antifriction bearings 101 (at least three) that are carried by studs 102, respectively, on the bottom wall 90 of the casing 72. Thus, the bearings 101 and the bearing 98 cooperate in rotatably supporting the coupling-element 93 relative to its companion element 94. The companion element 94 is provided by the shank 84 of the cover 83 and a permanent magnet or magnets 103 thereon. As shown in Fig. 6, the coupling-element 94 extends into a depressed wall-portion 104 of the casing 72, and is in magnetic driving relation with the companion element 93. For efficient performance of the magnetic coupling 92, the casing 72 is preferably made from a nonmagnetic material, such as aluminum or an aluminum alloy, for instance.

Provided in the centrifuge 73 are several identical body-members 106, in the present instance four, which, in contrast to the previously-described spherical body-members 57, are elongated hollow members, each being provided with an axially-extending tubular core 107 through which extends a stud 108 on which the respective body-member 106 is mounted with the aid of nuts 109. Each of the studs 108 is provided with a block-type head 110 which is pivotally mounted at 111 in a bearing-block 112 on the cover 83 of the bucket 82 (see also Fig. 7). Thus, the body-members 106 are swingable inwardly and outwardly about their respective pivot-supports 111.

Pivotally connected at 113 with each stud 108 is a bar 114, having a rack-portion 115 in permanent mesh with a spur gear 116 on a spindle 117 (Figs. 6 and 7) which is mounted with one end in a combination thrust-and-journal bearing 118 on the cover 83 of the bucket 82, and is journaled with its opposite end in the sleeve 85 on the bucket 82. Endwise motion of the spindle 117 is prevented by the gear 116 which is in close proximity to the adjacent end of the sleeve 85 (Fig. 6). The bars 114 are received for longitudinal movement in guideways 120, respectively, in a cage 121 which is freely slidable on the spindle 117 relative to the gear 116 thereon. The guideways 120 in the cage 121 are so coordinated that the rack-portions 115 of the bars 114 therein are in permanent mesh with the gear 116 on the spindle 117, as is clearly shown in Fig. 7. By virtue of the longitudinal guidance of the bars 114 in the cage 121, the latter will float on the spindle 117, upwardly or downwardly, as the body-members swing to and from their normal position of rest, respectively (Fig. 6).

To counteract the centrifugally-acting forces of the body-members 106 when the fluid-holding centrifuge spins, there are provided balanced and pre-loaded torsion-springs 123 and 124 which are anchored with their inner ends on the spindle 117 and with their other ends on studs 125 and 126, respectively, on the cover 83 of the bucket 82. The turns of the springs 123 and 124 expand in opposite directions so that the latter oppose each other.

Fluid from the casing 72 is admitted into the bucket 82 through inlets 130 in the bottom wall 86 of the latter, and fluid may be discharged from the bucket 82 through outlets 131 in the cover 83 thereof. It will be noted in Fig. 6 that the fluid-inlets 130 are closer to the rotary axis of the centrifuge 73 than the fluid-outlets 131 therein, wherefore circulation of fluid through the centrifuge will be induced when the latter spins.

Any outward or inward displacement in the fluid-holding centrifuge of the body-members 106 from their rest position by centrifugally-acting forces (Fig. 6) entails rotary motion of the spindle 117 in opposite directions, respectively, through intermediation of the bars 114 with their rack-portions 115 and the gear 116 on the spindle 117. The gear 116 is of such width as to remain in permanent mesh with the rack-portions 115 of the bars 114 throughout the limits of displacement of the body-members 106 in the centrifuge 73.

Rotation in either direction of the spindle 117, in consequence of displacement of the body-members 106 only and not in consequence of its rotation with the centrifuge, is transmitted to the spindle-member 71 through the motion-transmitter 74. To this end, the sleeve 85 on the bucket 82 and the upper end of the spindle 117 carry gears 140 and 139, respectively, of which gear 140 is in permanent mesh with a gear 141 of a planetary gearing 142, having an opposed gear 143 which is drivingly connected with the gear 139 through intermediation of an idler gear 144 (Figs. 6 and 8). The idler gear 144 may rotatably be mounted on an inwardly-projecting arm 145 of the bracket 91, while the gears 141 and 143 of the planetary gearing 142 are freely rotatable on a preferably integral sleeve 146 of a gear-cage 147 which carries pairs of diametrically-opposite intermediate gears 148 and 150, respectively, which are identical. The gears 141 and 143 are provided with preferably integral gears 152 and 153, respectively, of which gear 152 is in permanent mesh with the intermediate gears 150, and gear 153 is in permanent mesh with the intermediate gears 148 (Fig. 8). Further, the adjacent gears 148 and 150 of the pairs of intermediate gears are in permanent mesh with each other. The intermediate gears 148 and 150 are rotatably mounted in opposite recesses 154 and 155 in the peripheral wall 150a of the cage 147, while the gears 152 and 153 are received in said cage 147. The cage 147 is further provided with a tranverse web 156 from which the sleeve 146 extends in opposite directions (Fig. 6). Mounted in the sleeve 146 of the cage 147 for rotation therewith is a stub-shaft 157 which is rotatably supported with its ends in suitable bearings 158 and 159 in the top and bottom walls 160 and 161, respectively, of the bracket 91. Carried by the stub-shaft 157 is a gear 162 which is in permanent mesh with a gear 163 on the depending shank 164 of the driving-element 165 of a magnetic coupling 166, the driven-element 167 of which is carried by the spindle-member 71. The coupling-element 165, which is inside the casing 72 and journaled with its shank 164 in a bearing 168 in the top wall 160 of the bracket 91, carries a permanent magnet 169 which is in magnetic driving relation with a permanent magnet 170 of the companion element 167 outside the casing 72. The spindle-member 71, which carries the driven element 167 of the coupling 166, is journaled in a bearing or bearings 171 in a block 172 which is suitably mounted at 173 on a spider 174 that is, in turn, mounted on the top cover 75 of the casing 72 by screws 175, for instance. The bracket 91 is located in the casing 72 against rotation therein by a dowel pin or pins 176, and is securely held therein by several leaf-type springs 177 on the top cover 75 of the casing 72.

The gearing 142 is a typical planetary gearing in which the gear-cage 147 (that carries the intermediate gears 148 and 150 and the gear 162) will remain at rest as long as the gears 141 and 143 are turned at the same angular speed in opposite directions, respectively. Hence, the ratios between the gears 140 and 141 and between the gears 139 and 143 are the same (one-to-one in the present instance), and gear 143 is driven in a direction opposite to that of the gear 141 by virtue of the interposition between the former and the gear 139 of the idler gear 144.

On displacement of the body-members 106 in the centrifuge 73 from their normal rest position (Fig. 6), by the centrifugally-acting forces thereon, the spindle 117 will be turned in either direction, depending on the direction of displacement of the body-members 106 from their normal rest position. Rotary motion of the spindle 117 in consequence of the displacement of the body-members 106 in the centrifuge will result in rotation of gear 143 at an angular speed which is different from the invariable angular speed of the gear 141 (assuming that the centrifuge is spun at a constant speed), with the result that the gear-cage 147 is turned about its rotary axis in a direction and to an extent commensurate with the displacement of the body-members 106 in the centrifuge. This rotation of the gear-cage 147 in response to the displacement of the body-members 106 in the centrifuge will be transmitted to the spindle-member 71 through the meshing gears 162 and 163 and the magnetic coupling 166.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A density-sensing instrument, comprising a rotary container adapted to hold fluid; driving-means for said container; a rigid body in said container movable toward and away from the rotary axis thereof and having a density approximating those of fluids that may be density-tested in said container; and a device including resiliently deformable means for holding said body in a normal position within said container while the latter is not driven, and yieldingly resisting outward and inward movement of said body from said normal position in the spinning fluid-holding container, whereby the deformation of said means affords an indication of the density of fluid in said container.

2. The combination in a density-sensing instrument as set forth in claim 1, in which said body has a relatively large volume and is hollow so as to have said approximate density.

3. A density-sensing instrument, comprising a rotary container adapted to hold fluid; driving-means for said container; a rigid body in said container movable toward and away from the rotary axis thereof and having a density approximating those of fluids that may be density-tested in said container; a density-registering element movable independently of the rotation of said container; an operating connection between said element and body for translating centrifugal displacement of the latter in the fluid-holding container into movement of said element of proportional magnitude; and resilient means resisting said centrifugal displacement of said body.

4. A density-sensing instrument, comprising a support; a container rotatably mounted on said support and being adapted to hold fluid; driving-means for said container; a rigid body in said container movable toward and away from the rotary axis thereof and having a density approximating those of fluids that may be density-tested in said container; a density-registering element externally of said container and supported for movement independently of the spinning container; an operating connection between said element and body for translating centrifugal displacement of the latter in the fluid-holding container into movement of said element of proportional magnitude; and resilient means resisting said centrifugal displacement of said body.

5. A density-sensing instrument as set forth in claim 4, in which said element is reciprocable, and said operating connection translates inward and outward displacements of said body into reciprocation of said element of proportional magnitude and in opposite directions, respectively.

6. A density-sensing instrument as set forth in claim 4, in which said element is rotatable in opposite directions, and said operating connection translates inward and outward displacements of said body into turning motions of said element of proportional magnitude and in said opposite directions, respectively.

7. A density-sensing instrument, comprising a casing adapted to hold fluid; a closed container rotatably mounted in said casing and having a duct to provide communication between the interiors of said casing and container; driving-means for said container; a rigid body in said container movable toward and away from the rotary axis thereof and having a density approximating those of fluids that may be density-tested in said container; a density-registering element externally of said casing and supported for movement independently of the spinning container; an operating connection between said element and body for translating centrifugal displacement of the latter in the fluid-holding container into movement of said element of proportional magnitude; and spring-means resiliently resisting said centrifugal displacement of said body.

8. A density-sensing instrument, comprising a casing adapted to hold fluid and having a fluid-inlet and a fluid-outlet; a closed container rotatably mounted in said casing and having ducts differently spaced from the rotary axis of said container to provide communication between the interiors of said casing and container; driving-means for said container; a rigid body in said container movable toward and away from the rotary axis thereof and having a density approximating those of fluids that may be density-tested in said container; a density-registering element externally of said casing and supported for movement independently of the spinning container; an operating connection between said element and body for translating centrifugal displacement of the latter in the fluid-holding container into movement of said element of proportional magnitude; and spring-means resiliently resisting said centrifugal displacement of said body.

9. A density-sensing instrument as set forth in claim 8, in which said body is guided in said container for movement toward and away from the rotary axis thereof.

10. A density-sensing instrument as set forth in claim 8, in which said body is pivotally mounted in said container for rocking motion about an axis transverse to the rotary axis of the latter.

11. A density-sensing instrument as set forth in claim 8, in which said spring-means act directly on said operating-connection so that the latter will resiliently resist said centrifugal displacement of said body.

12. A density-sensing instrument as set forth in claim 8, in which said driving-means comprise a magnetic coupling having driving and driven elements externally and internally of said casing, respectively, in magnetic driving relation with each other, and said driven element is drivingly connected with said container.

13. A density-sensing instrument, comprising a casing adapted to hold fluid; a closed container rotatably mounted in said casing and having ducts differentially spaced from the rotary axis of said container to provide communication between the interiors of said casing and container; driving-means for said container; a rigid body pivotally mounted in said container for rocking motion about an axis transverse to the rotary axis of the latter, said body having a density approximating those of fluids that may be density-tested in said container; a spindle longitudinally reciprocable in said container coaxially thereof and extending to the outside of said container and casing, said spindle being operatively connected with said body so as to be reciprocated, on inward or outward displacements of said body in the fluid-holding container, through a proportional distance and in opposite directions, respectively; and spring-means resiliently resisting said displacements of said body.

14. A density-sensing instrument, comprising a closed casing adapted to hold fluid and having a fluid-inlet and a fluid-outlet; a closed container rotatably mounted in said casing and having ducts differently spaced from the rotary axis of said container to provide communication between the interiors of said casing and container; driving-means for said container; a plurality of identical rigid bodies pivotally mounted in angularly-spaced relation in said container at identical distances from the rotary axis of the latter for rocking motion about axes, respectively, which extend transversely of said rotary axis, said bodies being provided with followers, respectively, and each body having the same density approximating those of fluids that may be density-tested in said container; a spindle longitudinally reciprocable in said container coaxially thereof and extending to the outside of said container and casing, said spindle having in its periphery an endless groove in which said followers of said bodies are received for moving said spindle in opposite directions on inward and outward movements of said bodies, respectively; and opposed balanced springs resiliently resisting axial movement of said spindle from a certain intermediate position in either direction.

15. A density-sensing instrument, comprising a support; a container rotatably mounted on said support and being adapted to hold fluid; driving-means for said container; a rigid body mounted in said container for movement toward and away from the rotary axis thereof and having a density approximating those of fluids that may be density-tested in said container; a spindle journaled in said container for independent rotation coaxially thereof; an operating connection between said body and spindle for turning the latter in opposite directions on inward and outward motions of the former, respectively, in said container; an elastic coupling between said container and spindle; planetary gearing on said support having independently coaxially turnable first gears and an intermediate gear in mesh with, and bodily movable in an epicycloidal path about the common rotary axis of, said first gears; equal-ratio driving connections between said container and one of said first gears and between said spindle and the other one of said first gears, respectively, for driving said first gears in opposite directions, respectively; a rotatable density-registering element; and an operating connection between said intermediate gear and element for translating bodily motion of the former into rotary motion of the latter of proportional magnitude and in a corresponding direction.

16. A density-sensing instrument, comprising a closed casing adapted to hold fluid and having a fluid-inlet and a fluid-outlet; a closed container rotatably mounted in said casing and having ducts differently spaced from the rotary axis of said container to provide communication between the interiors of said casing and container; a rigid body mounted in said container for movement toward and away from the rotary axis thereof and having a density approximating those of fluids that may be density-tested in said container; a spindle journaled in said container for independent rotation coaxially thereof and extending with one end into said casing; a first operating connection between said body and spindle for turning the latter in opposite directions on inward and outward motions of the former, respectively, in said casing; an elastic coupling between said container and spindle; planetary gearing in said casing having independently coaxially turnable first gears and an intermediate gear in mesh with, and bodily movable in an epicycloidal path about the common rotary axis of, said first gears; equal-ratio driving connections between said container and one of said first gears and between said spindle end and the other one of said first gears, respectively, for driving said first gears in opposite directions, respectively; a rotatable density-registering element externally of said casing; and a second operating connection between said intermediate gear and element for translating bodily motion of the former into rotary motion of the latter of proportional magnitude and in a corresponding direction.

17. A density-sensing instrument as set forth in claim 16, in which said second operating connection includes a magnetic coupling having driving and driven elements internally and externally of said casing, respectively, in magnetic driving relation with each other.

18. A density-sensing instrument as set forth in claim 16, in which said body is pivotally mounted in said container for rocking motion about an axis transverse to the rotary axis of the latter, and said first operating connection includes a further gear on and turnable with said spindle, and a rack in mesh with said further gear and connected with said body remote from its pivot axis.

19. A density-sensing instrument as set forth in claim 16, in which said body is pivotally mounted in said container for rocking motion about an axis transverse to the rotary axis of the latter, and said first operating connection includes a further gear on and turnable with said spindle, a cage axially slidable on said spindle and having a guideway, and a rack in mesh with said further gear, said rack being received in said guideway and restrained thereby against movement relative thereto other than longitudinal movement transversely of said spindle, and being pivotally connected with said body remote from the pivot axis of the latter.

20. A density-sensing instrument as set forth in claim 16, in which there is provided a plurality of said rigid bodies which are identical in size, shape and weight and pivotally mounted in angularly-spaced relation in said container at equal distances from the rotary axis of the latter for rocking motion about axes, respectively, at right angles to said rotary axis, and said first operating connection includes a spur gear on and turnable with said spindle, a cage axially slidable on said spindle and having guideways, and racks in mesh with said spur gear, said racks being received in said guideways, respectively, and restrained thereby against movement relative thereto other than longitudinal movement perpendicular to said spindle, and being pivotally connected with said bodies, respectively, remote from the pivot axes of the latter.

21. A density-sensing instrument as set forth in claim 16, in which said elastic coupling is formed by opposed pre-loaded spiral torsion springs anchored with their inner ends to said spindle and with their outer ends to said container.

DENNISON H. MacDONALD.

References Cited in the file of this patent

UNITED STATES PATENTS

| Number | Name | Date |
|---|---|---|
| 2,229,681 | Sorensen | Jan. 28, 1941 |